US012389467B2

(12) United States Patent
Mildh et al.

(10) Patent No.: US 12,389,467 B2
(45) Date of Patent: Aug. 12, 2025

(54) TUNNEL INITIATION IN A COMMUNICATIONS NETWORK

(71) Applicant: Telefonaktiebolaget LM Ericsson (publ), Stockholm (SE)

(72) Inventors: Gunnar Mildh, Sollentuna (SE); Attila Mihály, Dunakeszi (HU); Paul Schliwa-Bertling, Ljungsbro (SE); Göran Rune, Linköping (SE); Gergely Pongrácz, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 332 days.

(21) Appl. No.: 17/760,119

(22) PCT Filed: Feb. 6, 2020

(86) PCT No.: PCT/EP2020/053041
§ 371 (c)(1),
(2) Date: Aug. 4, 2022

(87) PCT Pub. No.: WO2021/155939
PCT Pub. Date: Aug. 12, 2021

(65) Prior Publication Data
US 2023/0042390 A1 Feb. 9, 2023

(51) Int. Cl.
*H04W 76/12* (2018.01)
*H04W 36/02* (2009.01)
(Continued)

(52) U.S. Cl.
CPC .......... *H04W 76/12* (2018.02); *H04W 36/02* (2013.01); *H04W 48/17* (2013.01); *H04W 76/11* (2018.02)

(58) Field of Classification Search
CPC ..... H04W 76/12; H04W 36/02; H04W 48/17; H04W 76/11; H04W 36/12; H04W 76/22
See application file for complete search history.

(56) References Cited

U.S. PATENT DOCUMENTS 10,834,668 B2 * 11/2020 Qiao ............... H04W 60/04
2006/0023643 A1 2/2006 Lim
(Continued)

FOREIGN PATENT DOCUMENTS

WO 2019128657 A1 7/2019
WO WO-2019196000 A1 * 10/2019 ........ H04W 36/0055
WO 2020009630 A1 1/2020

OTHER PUBLICATIONS

Shin, Beomju, et al. "LTE RSSI based vehicular localization system in long tunnel environment." IEEE Transactions on Industrial Informatics 19.11 (2023): 11102-11114. (Year: 2023).*

(Continued)

*Primary Examiner* — Sharad Rampuria
(74) *Attorney, Agent, or Firm* — Rothwell, Figg, Ernst & Manbeck, P.C.

(57) ABSTRACT

One aspect provides a method performed by a radio access network node in a telecommunications network. The method comprises: responsive to detection of a trigger event associated with a wireless device having a connection to the telecommunications network via the radio access network node or seeking to establish a connection to the telecommunications network via the radio access network node, transmitting, directly to a user plane core network node, a message initiating establishment of a user-plane tunnel for the connection between the radio access network node and the user plane core network node. The message comprises one or more of: an indication of an identifier of the wireless device; and an indication of an identifier of a session for the wireless device, and further comprises an indication of a downlink tunnel endpoint identifier of the radio access network node.

19 Claims, 10 Drawing Sheets

(51) Int. Cl.
*H04W 48/00* (2009.01)
*H04W 76/11* (2018.01)

(56) References Cited

U.S. PATENT DOCUMENTS

| | | | |
|---|---|---|---|
| 2010/0002611 | A1 | 1/2010 | Umatt et al. |
| 2018/0270715 | A1 | 9/2018 | Lee et al. |
| 2018/0376384 | A1* | 12/2018 | Youn ................... H04W 36/144 |
| 2019/0182875 | A1* | 6/2019 | Talebi Fard .......... H04W 76/11 |
| 2020/0229024 | A1 | 7/2020 | Yang et al. |
| 2020/0322804 | A1* | 10/2020 | Vutukuri ............. H04W 12/106 |
| 2021/0235271 | A1 | 7/2021 | Bergquist |
| 2021/0266991 | A1* | 8/2021 | Teyeb ................ H04W 28/0268 |
| 2022/0061121 | A1* | 2/2022 | Han ...................... H04W 76/27 |
| 2023/0397291 | A1* | 12/2023 | Huang ................... H04L 49/90 |

OTHER PUBLICATIONS

Pateromichelakis, Emmanouil, et al. "Service-tailored user-plane design framework and architecture considerations in 5G radio access networks." IEEE Access 5 (2017): 17089-17105. (Year: 2017).*

International Search Report and Written Opinion issued in International Application No. PCT/EP2020/053041, dated Nov. 4, 2020 (10 pages).

International Search Report and Written Opinion dated Nov. 2, 2020 in International Application No. PCT/EP2020/053040 (11 pages).

Non-Final Office Action issued in U.S. Appl. No. 17/760,275 on Jan. 17, 2025 (14 pages).

Non-Final Office Action issued in U.S. Appl. No. 17/760,275 on May 30, 2025 (21 pages).

* cited by examiner

TUNNEL INITIATION IN A COMMUNICATIONS NETWORK

CROSS REFERENCE TO RELATED APPLICATION(S)

This application is a 35 U.S.C. § 371 National Stage of International Patent Application No. PCT/EP2020/053041, filed 2020 Feb. 6.

TECHNICAL FIELD

Embodiments of the disclosure relate to communications networks, and particularly to methods, apparatus and computer-readable media for user plane function selection in a communications network.

BACKGROUND

The 3GPP standardization organization has defined standards for a 5G New Radio (NR) radio interface and a 5G core network supporting communications to 5G capable wireless devices (in 3GPP called user equipments or UEs).

As part of this work, different logical nodes (or functions) are defined, including radio base stations (ng-eNBs, also known as gNBs), core network control plane nodes such as e.g. Access and Mobility Function (AMF), Session Management Function (SMF) as well as User Plane Functions (UPFs). These nodes perform certain functionality and communicate with other nodes over standardized interfaces. By defining these nodes, it is possible for vendors to build products which implement their functionality, such that operator networks support multi-vendor deployments.

The internal functional blocks as well as other details of the implementation of these nodes are left to each vendor. Similarly, it is up to each vendor if they want to implement the nodes using software components only which run on generic data center hardware or if they want to implement certain functions in dedicated hardware (or both).

In addition to logical network nodes and interfaces, 3GPP also defines signaling flows for different events occurring in 3GPP defined cellular networks. One such event is when the UE moves from one radio base station to another (e.g. handover or mobility). In this situation, the initial base station is called the "source" base station, while the new base station is called the "target" base station. When this happens there is a need to inform the UPF that the UE is now served by the target base station to ensure that the UPF sends data to the correct base station. An example signaling flow for this is shown in FIG. 1 (taken from 3GPP TS 23.502, v 16.3.0).

In this call flow the handover signaling is performed between the source and target radio access network (RAN) nodes (e.g., base stations, eNBs, gNBs and the like). Once the actual handover has occurred the target RAN node updates the AMF (see transmission of N2 Path Switch Request message), which in turn updates the SMF (see transmission of Nsmf_PDUSession Update message), which in turn updates the UPF (see transmission of N4 Session Modification Request message). The UPF switches the downlink data to the target RAN node and also sends one or more user plane end marker packets. The source RAN node forwards the end marker packets to the target RAN node. After handover but prior to transmission of the user plane end marker packets, the source RAN node forwards any downlink data packets received from the UPF to the target RAN node for onwards transmission to the UE. The reception of the end marker packets by the target RAN node constitutes an indication that any new downlink data packets received from the UPF on the downlink path can be forwarded to the UE, and that no more data packets will be received from the source RAN node.

In the call flow shown in FIG. 1, the same UPF could serve both the target and source RAN nodes. However, depending on the type of mobility, it may happen that there is a need to change UPF to serve the target RAN node (e.g. due to the target RAN node being in a different region which does not have direct access to the original UPF). In this case, it is possible to insert an intermediate UPF (I-UPF) according to the procedure shown in FIG. 2.

The call flow shown in FIG. 2 is similar to that shown in FIG. 1, with the exception of the SMF performing a UPF selection upon receiving notification of the handover of the UE to the target RAN node from the AMF. The SMF thus selects a new I-UPF and initiates signaling to add the I-UPF in the user plane between the target RAN node and original UPF. Uplink data is thereafter transmitted from the target RAN node to the original UPF, or anchor UPF, via the I-UPF.

Thus there is a considerable delay in the handling of data packets when a new UPF is selected following mobility of a UE from a source RAN node to a target RAN node. Until the new UPF (in the context of FIG. 2, the I-UPF) is selected and configured by the SMF, uplink data transmitted by the UE to the target RAN node cannot be handled by the network. Similarly, until the new UPF is selected and configured by the SMF, downlink data is transmitted to the UE only via the source RAN node, an extended pathway that also introduces delay. Depending on the services configured for the UE, such a delay may be unacceptable. For example, so-called ultra-reliable low-latency communications (URLLC) have extremely low targets for latency in the uplink and the downlink.

SUMMARY

Embodiments of the disclosure seek to address these and other technical problems.

In a first aspect there is provided a method performed by a radio access network node in a telecommunications network. The method comprises: responsive to detection of a trigger event associated with a wireless device having a connection to the telecommunications network via the radio access network node or seeking to establish a connection to the telecommunications network via the radio access network node, transmitting, directly to a user plane core network node, a message initiating establishment of a userplane tunnel for the connection between the radio access network node and the user plane core network node. The message comprises one or more of: an indication of an identifier of the wireless device; and an indication of an identifier of a session for the wireless device. The message further comprises an indication of a downlink tunnel endpoint identifier of the radio access network node.

Apparatus and computer-readable media for performing the method of the first aspect are also provided. For example, in one embodiment the disclosure provides a radio access network node for a telecommunications network. The radio access network node comprises processing circuitry and a non-transitory computer-readable medium storing instructions, which, when executed by the processing circuitry, cause the radio access network node to: responsive to detection of a trigger event associated with a wireless device having a connection to the telecommunications network via the radio access network node or seeking to establish a connection to the telecommunications network via the radio access network node, transmit, directly to a user plane core network node, a message initiating establishment of a user-plane tunnel for the connection between the radio access network node and the user plane core network node. The message comprises one or more of: an indication of an identifier of the wireless device; and an indication of an identifier of a session for the wireless device. The message further comprises an indication of a downlink tunnel endpoint identifier of the radio access network node.

In a second aspect there is provided a method performed by a user plane core network node for a telecommunications network. The method comprises: responsive to detection of a trigger event associated with a wireless device having a connection to the telecommunications network via a radio access network node or seeking to establish a connection to the telecommunications network via the radio access network node, receiving a message directly from the radio access network node. The message comprises one or more of an indication of an identifier of the wireless device and an indication of an identifier of a session for the wireless device. The message further comprises an indication of a downlink tunnel endpoint identifier of the radio access network node. The method further comprises using the indication of the downlink tunnel endpoint identifier to establish a downlink user plane tunnel to the radio access network node for a session between the radio access network node and the wireless device.

Apparatus and computer-readable media for performing the method of the first aspect are also provided. For example, in one embodiment the disclosure provides a radio access network node for a telecommunications network. The radio access network node comprises processing circuitry and a non-transitory computer-readable medium storing instructions, which, when executed by the processing circuitry, cause the radio access network node to: responsive to detection of a trigger event associated with a wireless device having a connection to the telecommunications network via a radio access network node or seeking to establish a connection to the telecommunications network via the radio access network node, receive a message directly from the radio access network node, the message comprising one or more of an indication of an identifier of the wireless device and an indication of an identifier of a session for the wireless device, and further comprising an indication of a downlink tunnel endpoint identifier of the radio access network node; and use the indication of the downlink tunnel endpoint identifier to establish a downlink user plane tunnel to the radio access network node for a session between the radio access network node and the wireless device.

DETAILED DESCRIPTION

Figure 1:
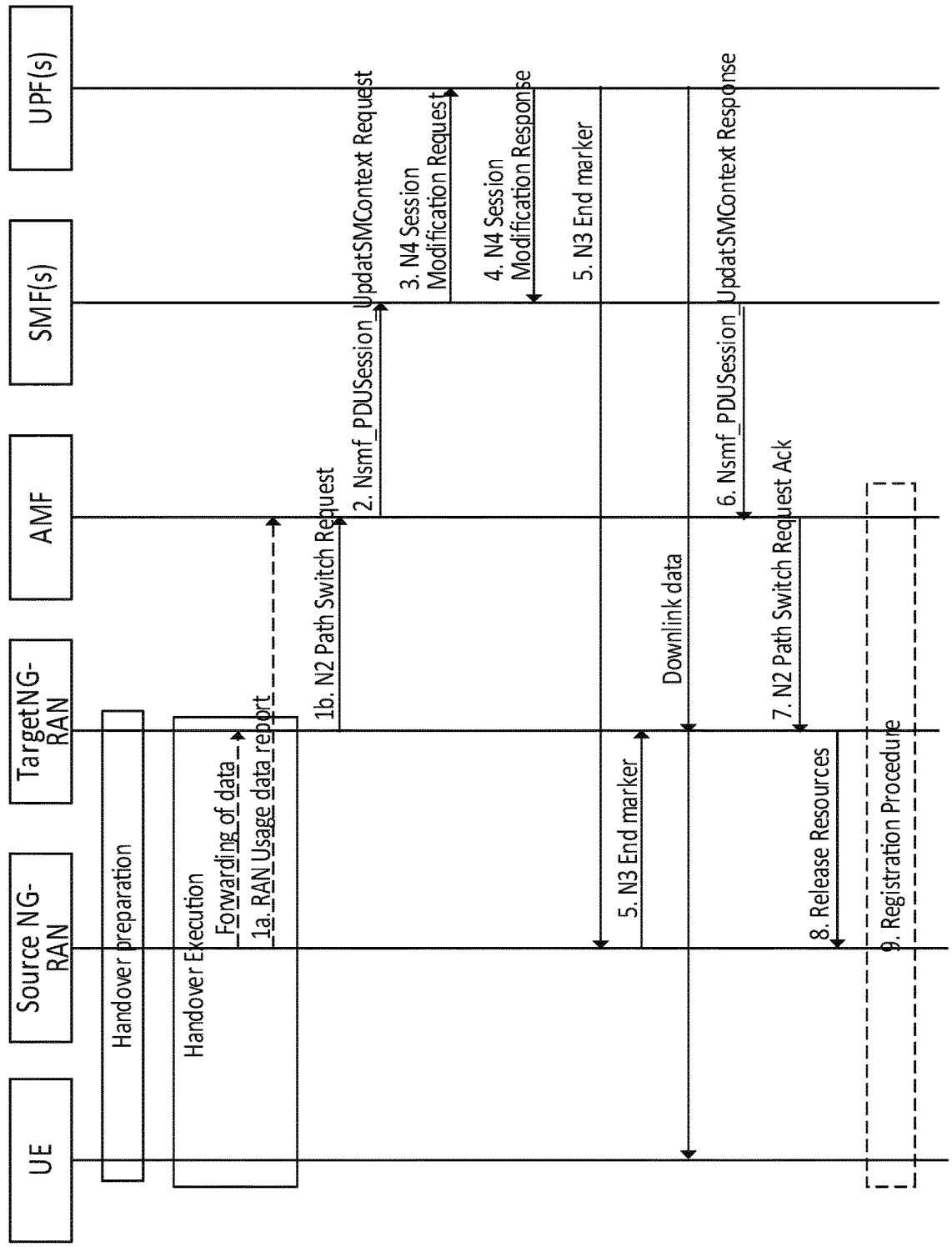
FIG. 1 is a signaling diagram showing handover without UPF re-allocation as described in 3GPP TS 23.502, v 16.3.0 (see Figure 4.9.1.2.2-1)
Figure 2:
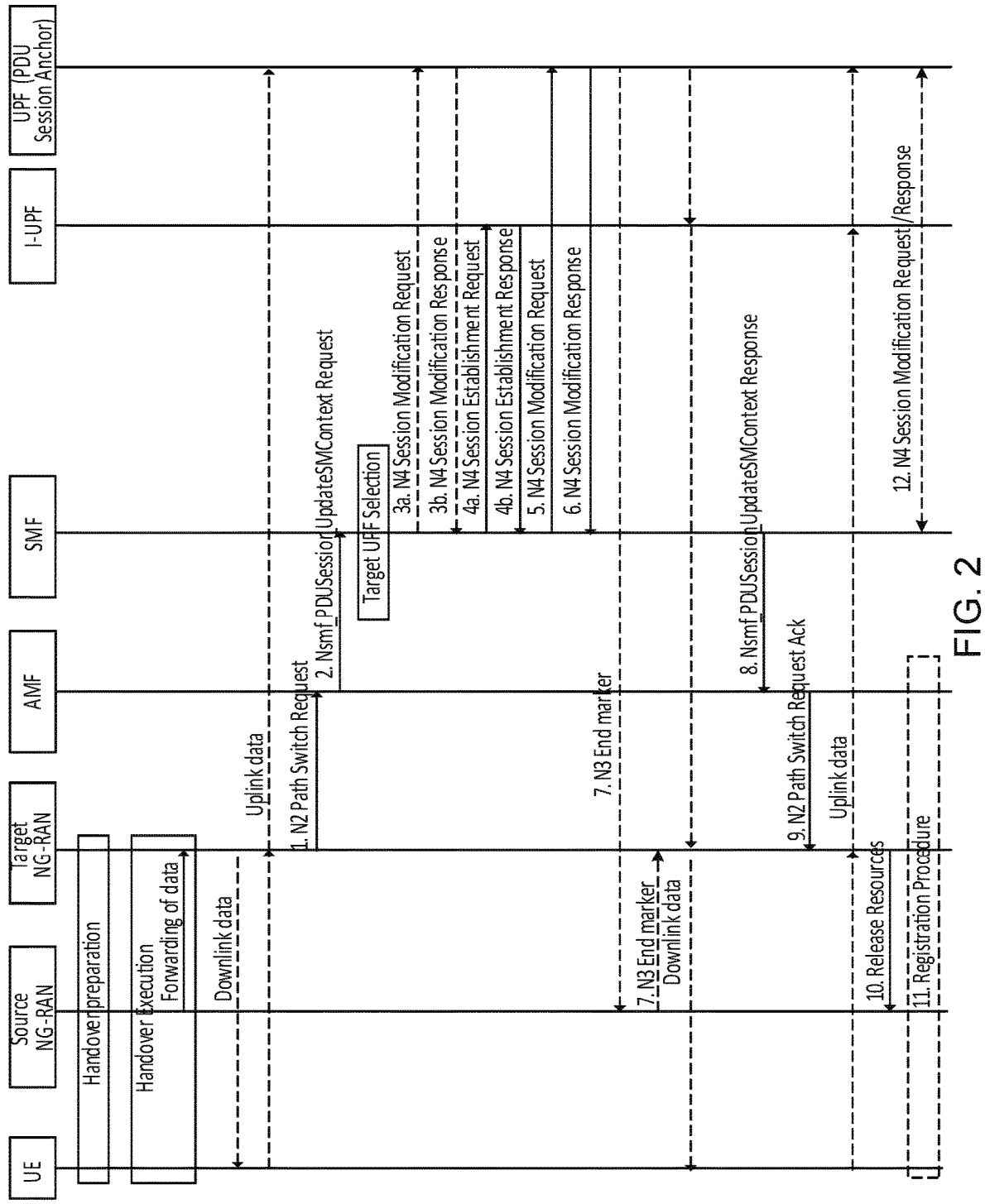
FIG. 2 is a signaling diagram showing handover with insertion of an intermediate UPF as described in 3GPP TS 23.502, v 16.3.0 (see Figure 4.9.1.2.3-1)

Embodiments of the disclosure seek to address the problems noted above by the RAN node for a connection (such as the target RAN node involved in handover of the wireless device) transmitting a message directly to a UPF selected for the connection, comprising an identifier for a context of the connection, and also a downlink tunnel endpoint identifier of the RAN node. Thus, responsive to detection of a trigger event, the RAN node transmits a message to a user plane core network node (e.g., a UPF) comprising one or more of an indication of an identifier of the wireless device, and an indication of an identifier of a session for the wireless device, and also an indication of a downlink tunnel endpoint identifier of the RAN node. Similarly, the user plane core network node, receiving the message from the RAN node, is able to utilize the identifier of the wireless device or the session for the wireless device to retrieve a context for the session (e.g., from a data storage layer or its own storage), and to use the downlink tunnel endpoint identifier to establish a downlink user plane tunnel for the session to the RAN node.

In this way, the user plane core network node is provided with information enabling it to establish a downlink user plane tunnel to the RAN node for a session, without requiring reconfiguration by another core network entity such as an SMF or AMF. Downlink data can be provided directly to the RAN node more quickly than possible in conventional systems. For example, upon handover of the wireless device, downlink data can be provided directly to the target RAN node more quickly than is possible using conventional methods.

The trigger event may be associated with handover of the wireless device, mobility events in general or other events (such as state transition, radio resource control (RRC) connection re-establishment after RRC connection failure, etc).

For cases relating to mobility, where a different user plane core network node is configured for the session after the trigger event, embodiments of the disclosure enable network implementations to be realized in which multiple UPFs share a data storage layer. In turn, such implementations can lead to reductions in the amount of core network signaling required at certain trigger events, and in particular can avoid the need for control plane signaling to and from the SMF in order to transfer the context of the connection from one UPF to another UPF on detection of the trigger event.

Embodiments of the disclosure may also comprise the introduction of a UPF selection mechanism in the RAN node. In such embodiments, selection of the UPF may be based on one or more policies, wireless device information, and/or other information. For example, the RAN node may first determine whether it is necessary to select a new UPF responsive to detection of the trigger event and, if so, determine which UPF to select.

By introducing a UPF selection mechanism into a RAN node, the latency of uplink communications by the wireless device can be reduced, particularly on protocol data unit (PDU) session establishment. In particular, the RAN node need no longer wait for selection of the UPF by the SMF, but may instead forward uplink data directly to the selected UPF. In addition, according to some embodiments of the disclosure, control plane signaling between the RAN and the SMF can be reduced.

These and other aspects of the disclosure are described in more detail below.

Figure 3:
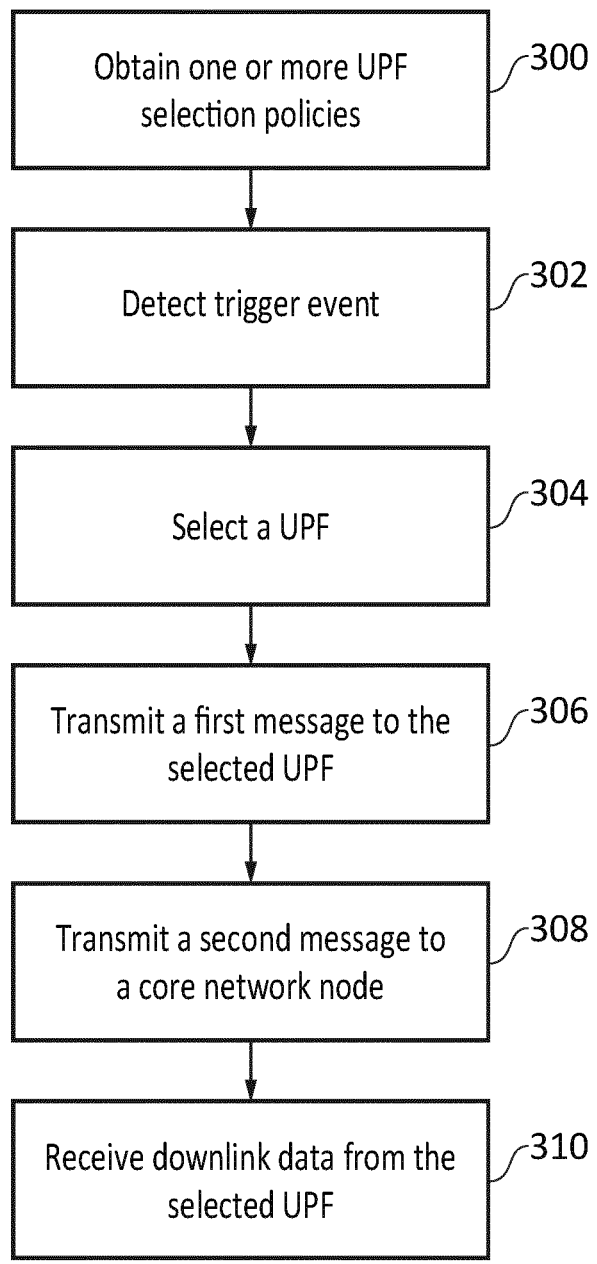
FIG. 3 is a flowchart of a method performed by a radio access network node according to embodiments of the disclosure.

FIG. 3 is a flowchart of a method performed by a radio access network node (e.g., a base station such as an eNB, gNB, or other node within the radio access network) according to embodiments of the disclosure. In some embodiments, particularly those relating to mobility of a wireless device, the method may be performed by a radio access network node which is the target RAN node of the wireless device mobility. In other embodiments, which do not relate to mobility of a wireless device for example, the method may be performed by a serving RAN node of the wireless device.

Some embodiments of the disclosure provide for the selection of a UPF by the RAN node itself. In such embodiments, selection of the UPF for a connection may be made according to one or more UPF selection policies. Accordingly, the method begins in step 300 with an optional step of obtaining one or more UPF selection policies.

The one or more UPF policies may be received from a core network node, such as the SMF, the Policy Control Function (PCF), the AMF or any other core network node. For example, the UPF policies may be signaled to the RAN node from a core network node during establishment of a Protocol Data Unit (PDU) session for a wireless device, and particularly during establishment of resources for the PDU session.

A number of different core network nodes may maintain the UPF selection policies and provide the indication of the UPF selection policies to the UPF during PDU session establishment. For example, where the PCF maintains the one or more UPF selection policies, these UPC selection policies may be indicated to the SMF, forwarded by the SMF to the AMF, and forwarded to the RAN node by the AMF. Where the SMF maintains the one or more UPF selection policies, these UPC selection policies may be indicated to the AMF, and forwarded to the RAN node by the AMF. Where the AMF maintains the one or more UPF selection policies referred to above, these UPC selection policies may be indicated directly to the RAN node by the AMF.

Alternatively, the RAN node may obtain the one or more UPF selection policies through interactions with another function (e.g., a RAN function or a core network function) that holds or maintains the policies for the user (using an identifier for the wireless device, or an index/pointer).

In other embodiments, the one or more UPF selection policies may be provided to the RAN node from one or more other RAN nodes (e.g., during handover of the wireless device from a source RAN node to the target RAN node, or during context retrieval by a target RAN node for a wireless device which resumes a connection to the network through the target RAN node), or configured in the RAN node, e.g. by a core network node or during deployment of the network.

In yet further embodiments, one or more of these different mechanisms for informing the RAN node of the UPF selection policies may be combined, such that different mechanisms are used for indicating different types of UPF selection policy, or for indicating UPF selection policies during different procedures. In one embodiment, UPF selection policies which are static, or which are expected to remain static, may be directly configured in the RAN node at the time of its deployment in the network. For example, the RAN node may be configured to select from one or more local UPFs that are configured for local breakout of traffic. UPF selection policies which are dynamic, or expected to be dynamic, may be signaled to the RAN node by another RAN node (e.g., the source RAN node during handover of the wireless device to the RAN node performing the method) or a core network node (e.g., as described above during PDU session establishment and/or following a transition of the wireless device to an active or connected RRC state).

The one or more UPF selection policies may be indicated (e.g., by the other RAN node or core network node) by providing the full UPF selection information itself, or by an index or some other pointer to a predefined UPF selection policy or policies. The latter embodiment may be especially useful for UPF selection policies which are signaled by a source RAN node during handover, by reducing the amount of signaled bits and so providing a more efficient interface between RAN nodes. The predefined UPF selection policy or policies may be stored in the RAN node itself, or retrieved from another node such as a core network entity.

The one or more UPF selection policies may be based on one or more of the following for the wireless device: subscription information, mobility history, traffic history, network slice information, service information etc. For example, any of the subscription information, network slice information and service information may specify a particular quality of service (QoS) which is to be met by the connection. The RAN node may thus preferentially select a UPF which is able to meet the specified QoS. The mobility history of the wireless device may be used to select a UPF based on UPFs which have previously handled connections for wireless devices attached to the cells listed in the mobility history, while the traffic history may be used to select a UPF which has suitable bandwidth to meet the likely traffic demands of the connection.

The one or more UPF selection policies may comprise a rule for selection of a UPF based on the proximity of the RAN node to UPFs. For example, the RAN node may be configured to select, or to preferentially select, UPFs which are closer to the RAN node (e.g., geographically, or in terms of number of hops in the network) so as to reduce latency in the connection. The one or more UPF selection policies may comprise a rule for selecting a UPF based on previous use of UPFs for performing services associated with particular trigger events. For example, if a UPF has been used for a connection prior to handover of the wireless device to the RAN node (i.e., the trigger event is mobility of the wireless device to the RAN node), the RAN node may preferentially select that UPF for the connection. The one or more UPF selection policies may comprise a rule for selecting a UPF based on performance considerations, for the wireless device and/or the network. In the former case, the one or more UPF selection policies may comprise a rule which preferentially selects UPFs associated with relatively low latency traffic (e.g., as measured or reported previously). In the latter case, the one or more UPF selection policies may comprise a rule which selects UPFs based on load sharing (e.g., hash-based load sharing) between multiple UPFs.

Those skilled in the art will appreciate that any one or more of these UPF selection policies may be combined, and moreover may interact with each other when combined. For example, a UPF selection policy which requires the RAN node to select or preferentially select UPFs which are closer to the RAN node may introduce other conditions to be taken into consideration when selecting the UPF. For instance, if the service requires a latency below some threshold, a UPF selection policy could be introduced to select a UPF which is as close as possible to the RAN node (rather than a UPF which only just fulfills the latency requirement). In this case, the UPF selection policy based on proximity interacts with a UPF selection policy based on the cost of utilizing the UPF. Typically, the more distributed the UPF, the higher the cost. Thus the cost-based UPF selection policy interacts with the latency-based UPF selection policy to create an overall policy that selects the closest possible UPF to the RAN node. Of course, further UPF selection policies may be combined to change the overall UPF selection again.

As part of step 300, the RAN node may additionally receive information identifying those UPFs in the network which are accessible by the RAN node and/or available. The information may include, for example, logical network addresses or a range of logical network addresses for the UPFs (e.g., IP addresses or a range of IP addresses). This information may be provided to the RAN node via a domain name system (DNS) server or other database-related mechanism, or it can be signaled from the AMF, the SMF or another core network function.

In step 302 the RAN node determines that a trigger event associated with a wireless device is detected. The wireless device has a connection to the RAN node, or is seeking to establish or resume a connection to the RAN node. The trigger event may therefore be detected by the RAN node itself, or the RAN node may be informed that the trigger event has been detected by another node or function. Possible trigger events include PDU session establishment for the wireless device, handover of the wireless device to the RAN node, a change in the connection state of the wireless device from an inactive state to an active one (such as a transition from connection mode Idle to connection mode Connected, or a transition from RRC_INACTIVE to RRC active or CONNECTED), a change in measured key performance indicator (KPI) values for the wireless device (such as one or more KPIs falling below thresholds), connectivity problems for the wireless device, etc.

In step 304, responsive to detection of the trigger event in step 302, the RAN node optionally selects a UPF for the connection of the wireless device. Where the RAN node received one or more UPF selection policies, e.g., in step 300 described above, the selection of the UPF may be made according to the one or more UPF selection policies. The UPF selection may be based additionally on the UPFs which are available and/or accessible to the RAN node.

Alternatively, the RAN node may not select the UPF, but rather be informed of the UPF for the session by a core network node or entity, or another RAN node or entity. For example, where the trigger event detected in step 302 relates to mobility of the wireless device from a source RAN node to the RAN node (acting as target RAN node), the RAN node may receive an indication of an uplink tunnel endpoint identifier for the UPF from the source RAN node (e.g., in a handover request message or other handover-related message). Alternatively, the UPF may receive an indication of an uplink tunnel endpoint identifier for the UPF of the session from a core network node or entity during establishment of the session, or upon resuming a session for a wireless device transitioning from an inactive or idle connection mode to an active or connected mode.

Figure 5:
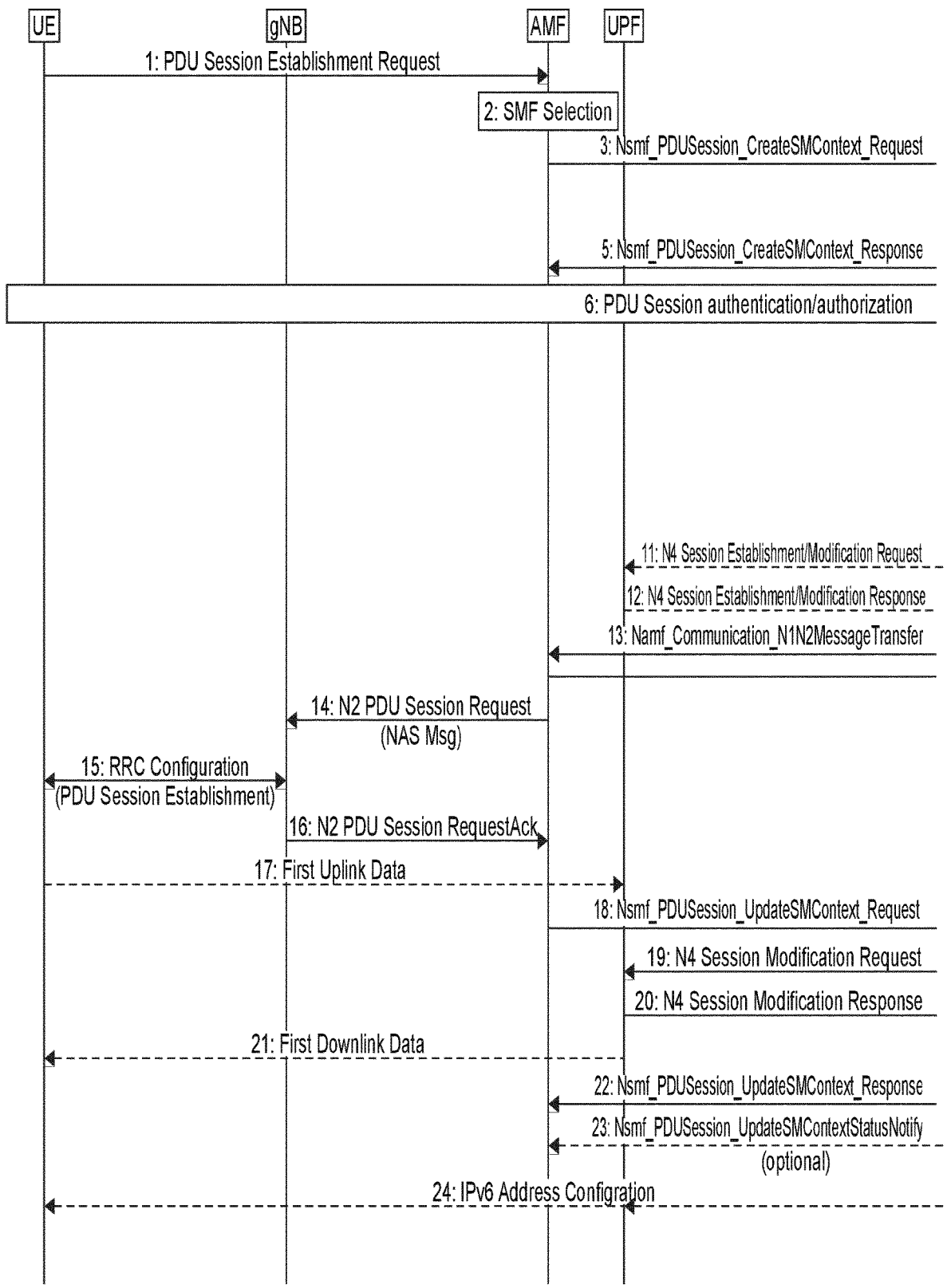
FIG. 5 is a signaling diagram showing establishment of a PDU session according to embodiments of the disclosure.
Figure 5:
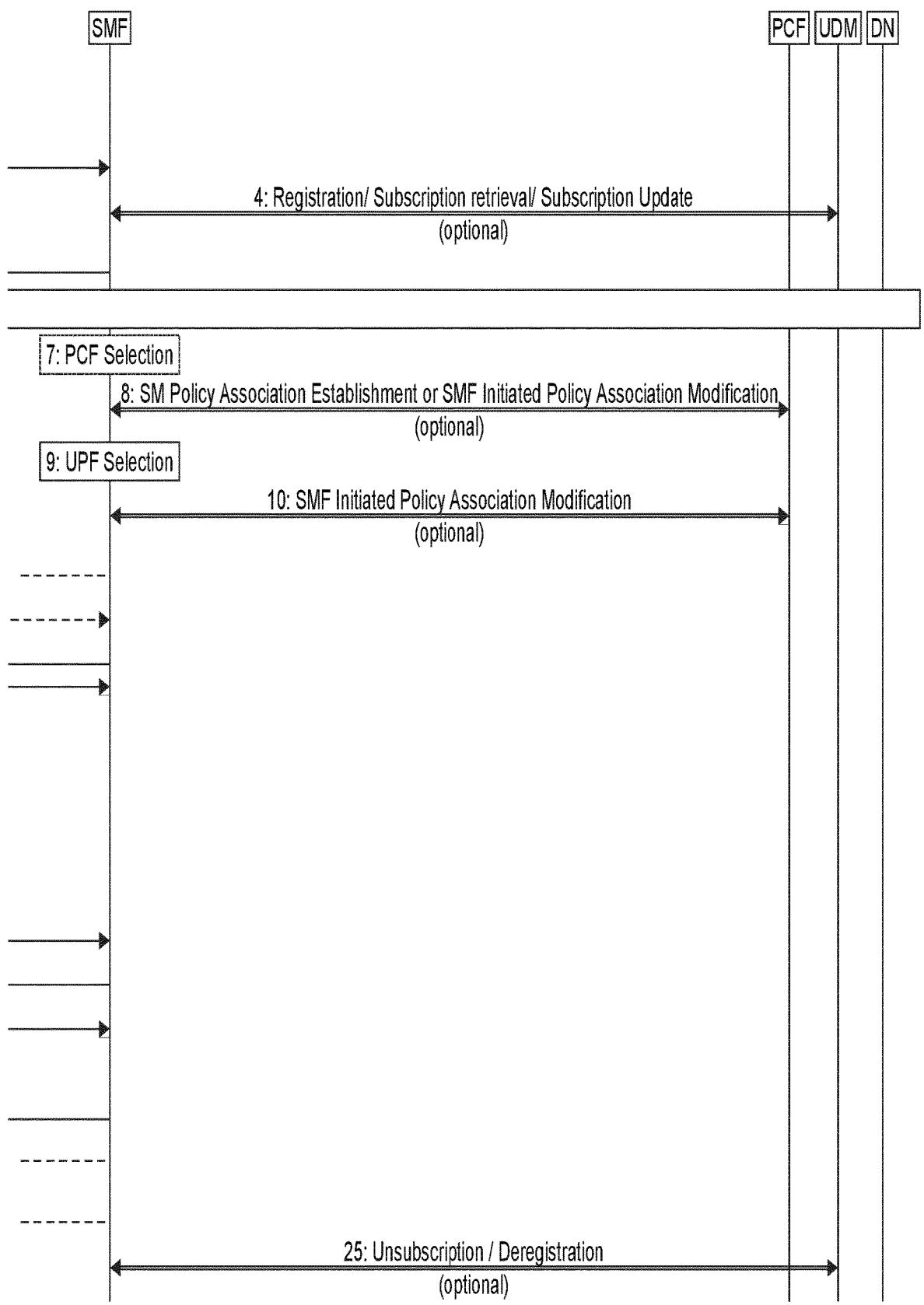

See, for example, the signaling diagram of FIG. 5, which shows PDU session establishment according to embodiments of the disclosure, and is taken from 3GPP TS 23.502.

The detail of this signaling is not relevant for an understanding of embodiments of the disclosure, and moreover will be familiar to those skilled in the art. Therefore a detailed discussion of the signaling of FIG. 5 is omitted.

In the particular illustrated example, PDU session establishment is initiated by the UE, i.e., through transmission of a PDU Session Establishment Request message to the AMF in step 1. The principles disclosed herein are not so limited to UE-initiated PDU session establishment, however, and may straightforwardly be applied to RAN or core network initiated PDU session establishment for example. Returning to FIG. 5, and the AMF selects an SMF and requests creation of an SM context at the selected SMF in step 3 through transmission of a Nsmf_PDUSession_CreateSMContext_Request message. Thereafter, the SMF communicates with the PCF (e.g., in steps 8 and 10), and, in step 13, transmits information to the AMF to be forwarded to the RAN node (e.g., gNB in FIG. 4). In step 14, the AMF transmits information to the RAN node in an N2 PDU Session Request message. Note that this message may additionally comprise the establishment of resources for the PDU session.

The process shown in FIG. 5 may be adapted in various ways to provide for the indication to the RAN node of the UPF for the session. For example, the AMF may provide an indication of an uplink tunnel endpoint identifier for the UPF in the message transmitted in step 14.

The procedure for IDLE to CONNECTED transition will be similar to the PDU session establishment shown in FIG. 5. In this case, however, the AMF may include information about the UPF (including uplink tunnel endpoint identifiers) in a UE context setup message sent to the RAN node.

In step 306, the RAN node initiates establishment of an uplink user plane (UP) tunnel for the connection to the UPF selected in step 304 by transmitting a message directly to the selected UPF. The message may comprise a user data uplink packet, comprising user data or dummy data for the purposes of initiating the UP tunnel (e.g., a packet containing no payload, or a payload of filler bits), or a special signaling message which is nonetheless transmitted over the user plane.

According to embodiments of the disclosure the message transmitted in step 306 comprises an indication of a downlink tunnel endpoint identifier of the radio access network node. For example, the downlink tunnel endpoint identifier may comprise a full GTP tunnel endpoint identifier (TEID) and a logical network address of the RAN node (e.g., an IP address or other transport network layer address such as Ethernet medium access control (MAC) address). This information enables the UPF to route new downlink packets directly to the RAN node, rather than waiting for configuration by other core network nodes such as the AMF or SMF. In this way there is no reason for the AMF to relay any information to the SMF about the UE context in RAN so steps 18 and 19 in FIG. 5 become optional and may be omitted. Instead the UPF will receive information about downlink tunnel identifiers with the first uplink data packet (in step 17 of FIG. 5).

According to embodiments of the disclosure, the message transmitted in step 306 further comprises an indication of a context for the session of the wireless device. This context identifier may comprise an identifier for the wireless device, and/or an identifier for the PDU session of the wireless device, to enable the selected UPF to retrieve the context for the session. Where the selected UPF is the same UPF as previously configured for the session (e.g., the trigger event detected in step 302 is not mobility-related, or the RAN node selects in step 304 the same UPF as handled the session prior to mobility of the wireless device), the context may be stored locally at the selected UPF.

In other embodiments, the identifier of the PDU session and/or the wireless device enables the UPF to retrieve the context from a data storage layer, which may be shared with one or more further UPFs.

That is, deployments of core network nodes may utilize an architecture referred to as "stateless" implementation. According to this architecture, the functions of the node are divided into "state-less" worker modules and a "stateful" data storage layer. In such an architecture the worker modules, which handle packet processing for instance, will only maintain a context for each packet processing flow temporarily, while they are working with that flow. The context can be discarded when the worker module is no longer working with that flow. Any information which needs to be maintained for future processing is instead stored in the data storage layer, which is shared between multiple worker modules.

Possible advantages with such an architecture include:
The number of worker modules can easily be scaled up at increased load conditions, since every new flow could be assigned to the worker which is least busy.
The number of worker modules can easily be scaled down at decreased load conditions, since it is possible to move a flow to another worker module using the information stored in the data storage layer.
The architecture achieves higher resilience/redundancy since if one worker "crashes" or malfunctions and needs to be restarted, it is possible to restart the processing of the flows from the information stored in the data storage layer. This can be done either by the restarted worker or by other available workers.

This concept may be expanded by allowing the data storage layer to cover multiple logical nodes. For example, the UPF nodes responsible for processing user data packets for different end user data flows may have access to a shared data storage layer. By expanding the data storage layer to cover multiple UPFs (meaning it is accessible by multiple UPFs), it would be possible for a worker module in one UPF to obtain the context of a user data packet processing flow which was previously handled by a worker module in a different UPF. In this way it would be possible to handle a wireless device (UE) which moves from one UPF to another UPF without requiring specific control signaling to transfer the context between the UPFs (as is today performed by the SMF).

In one embodiment, therefore, the UPF is implemented using the architecture described above, and particularly comprises one or more state-less worker modules which are able to access a "stateful" data storage layer. The data storage layer is shared between a plurality of UPFs (of which the selected UPF is one), such that each UPF in the plurality of UPFs is able to access the data storage layer. For example, the data storage layer may be defined for a local breakout (LBO) area or other network area, such that all UPFs within the network area are able to access and share the data storage layer. Different network areas may implement different data storage layers accessible by the respective UPFs of those areas. Of course, those skilled in the art will appreciate that alternative deployments are possible without departing from the scope of the claims appended hereto.

The worker modules, which handle packet processing for instance, maintain a context for each packet processing flow temporarily, while they are working with that flow. The context comprises information which needs to be maintained for future processing. Once the worker module is no longer working with that flow, the context is discarded by the worker module and stored in the data storage layer, which is shared between multiple worker modules.

Upon receiving the message transmitted in step 306, a UPF with this architecture is able to retrieve the context for the session from the data storage layer, by its association with the identifier of the PDU session and/or the wireless device.

The identifier for the context may correspond to or comprise an identifier for the wireless device and/or the PDU session of the wireless device. In some embodiments, the identifier comprises a tunnel endpoint identifier (e.g., a GPRS Tunneling Protocol Tunnel Endpoint Identifier, GTP TEID). In some embodiments, the identifier may further comprise a logical network address (e.g., an Internet Protocol address), such that the identifier corresponds to a combination of a tunnel endpoint identifier and a logical network address.

The identifier for the context may be unique among those wireless devices having contexts stored within the data storage layer, or unique among all the contexts stored within the data storage layer.

The identifier for the context of the session may be assigned by the original UPF for the session or connection for the wireless device, with the data storage layer ensuring that the identifier is unique amongst the identifiers stored within the particular data storage layer.

For example, an identifier may be introduced which is valid in every UPF (e.g., that has access to the same data storage layer). In this solution the RAN node (e.g., where the trigger event is a mobility event) is enabled to select any UPF identified by different IP addresses, and the new UPF is able to retrieve the context from the data storage layer using the unique identifier. One advantage of this solution is that the IP layer (transport network layer) and the application layer (GTP) are separated from each other which simplifies implementation, testing etc.

For example, the UPF may generate a random identifier for the context, and check with the data storage layer whether that identifier is available (i.e., not used to identify any other session with a context stored in the data storage layer). If the identifier is available, the context can be stored in the data storage layer and associated with the identifier; if the identifier is not available, a further random identifier for the context is generated by the UPF. Those skilled in the art will appreciate that various alternatives to this process exist. For example, a UPF may generate an identifier in a structured way, designed to reduce the likelihood of collision between identifiers. Each UPF may be pre-assigned a respective range of values, from which to select identifiers. In a further alternative, a UPF may pre-register a range of values with the data storage layer, guaranteed to be unique at the data storage layer. In this case the UPF need not check with the data storage layer that a particular identifier value is available before its assignment to a session or context, and this can reduce latency when assigning identifiers for a newly established PDU session. When pre-registering the range of values, however, the UPF may follow a similar process as described above, by generating one or more identifiers (e.g., randomly) and checking with the data storage layer when those identifiers are available.

In one embodiment, the context identifier in the message transmitted in step 306 may correspond to the complete context identifier previously used to the UPF (e.g., including both old GTP TEID and IP address prior to handover of the wireless device). Alternatively, a new default context identifier (e.g. a pre-defined value) may be used when the RAN node communicates for the first time and/or transmits a first uplink packet to a new UPF. This default context identifier may indicate to the new UPF that a new identifier needs to be allocated. The new UPF can then respond with a message which contains a new identifier for the wireless device which is associated with the IP address of the new UPF (in the case of UPF change). One advantage of this solution is that the context identifier does not need to be globally unique since it can be changed at any time when the UPF changes. The context identifier can be provided in the GTP header (e.g. extension header) of an UL packet to the UPF.

In a further alternative embodiment, the context identifier may comprise the old UE context identifier for reaching the UE and to include the old UPF IP address. If there is a need to select a new UPF (or UPF worker module), it is possible to use a load balancing function to re-direct an uplink packet to a new UPF taking over processing of the wireless device context. As a result of this, the RAN node may receive a response message assigning a new context identifier to be used for further communication (e.g., similar to the description above). It is also possible for the RAN node to continue to use the old IP address (i.e. for the old UPF) and rely on the load balancing function to route the packet to the new UPF (or UPF worker module). One advantage of this solution is that the context identifier does not need to be globally unique since it can be changed at any time when the UPF changes.

Each of the identifiers described above (i.e., the identifier of the wireless device, the identifier of the session for the wireless device, the downlink tunnel endpoint identifier) may be included in a header of the UL packet, for example by using a GTP extension header. Where the UL packet comprises a special signaling packet as described above, the packet may be configured according to the GTP Control (GTP-C) protocol.

Thus the selected UPF receives the uplink packet transmitted in step 306, and is able to retrieve the context of the PDU session or the connection from the data storage layer that it shares with the UPF which handled the PDU session or the connection previously. Aspects of this process are described below with respect to FIG. 4.

In some embodiments, the RAN node is configured to update other core network nodes about mobility or other trigger events associated with the wireless device. Thus in step 308 the RAN node optionally transmits a second message to a core network node or entity (such as a SMF or an AMF), comprising an indication of the trigger event associated with the wireless device. For example, the second message may comprise an indication that the wireless device has been handed over from a source RAN node to the RAN node. In another example, the second message may comprise an indication that the wireless device has transitioned to an active connection state from an inactive or idle connection state, or an indication that the wireless device has established, re-established or resumed a connection to the RAN node. The second message may be transmitted in parallel with the first message transmitted in step 306.

In alternative embodiments, the UPF may be configured to update other core network nodes or entities (e.g., AMF and/or SMF) about the trigger event. In such embodiments, the RAN node need not perform step 308.

As noted above, the information contained in the first message transmitted in step 306 enables the UPF to establish a downlink user plane tunnel to the RAN node for the transmission of downlink data. Thus in step 310 the RAN receives one or more downlink data packets directly from the UPF, over a downlink user plane tunnel.

Those skilled in the art will appreciate that the order of the steps described with respect to FIG. 3 may be altered without adversely affecting the functionality of the overall method. For example, in one embodiment the one or more UPF selection policies may be obtained (i.e. in step 300) after detection of the trigger event in step 302, or at the same time as detection of the trigger event. In the latter case, the RAN node may receive a message from a source RAN node indicating that handover of the wireless device is needed (i.e., the trigger event is receipt of such a message from the source RAN node), and any UPF selection policies to be applied by the RAN node in step 304 may also be indicated in the message. Similarly, the RAN may receive a message requesting establishing of a PDU session, and only thereafter (or at the same time, based on policies indicated in the message) obtain the one or more UPF selection policies to be applied.

Figure 4:
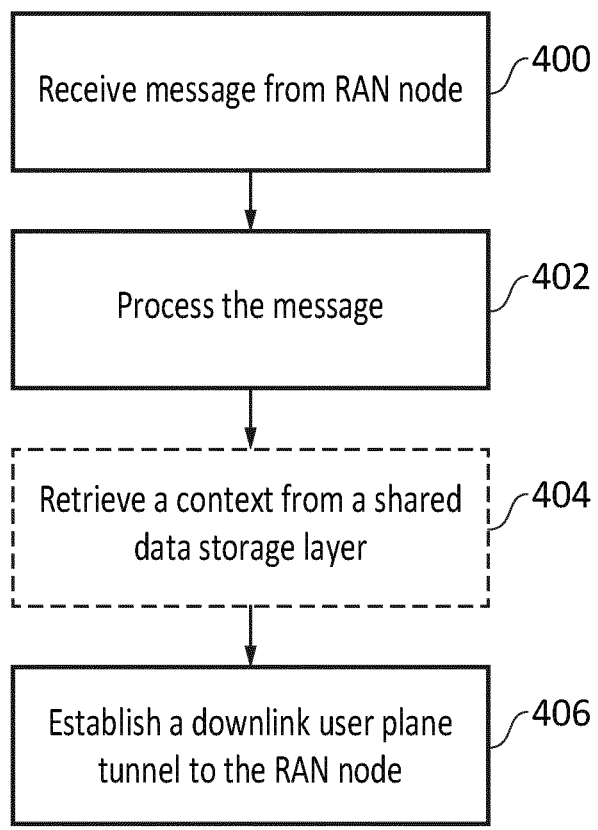
FIG. 4 is a flowchart of a method performed by a user plane core network node according to embodiments of the disclosure.

FIG. 3 sets out a method in a RAN node for initiating a tunnel to a UPF, and enabling the UPF to establish a tunnel to the RAN node. FIG. 4 is a flowchart of a method performed by a user plane core network node (e.g., a UPF). In some aspects, this method provides the UPF counterpart to the method described with respect to FIG. 3, and should be read in conjunction with that part of the disclosure. The following description describes the user plane core network node as a UPF, but those skilled in the art will appreciate that the embodiments described herewith may be applicable to other core network nodes providing user plane functions.

As noted above, in some embodiments the UPF is implemented using the architecture described above, and particularly comprises one or more state-less worker modules which are able to access a "stateful" data storage layer. The data storage layer is shared between a plurality of UPFs (of which the selected UPF is one), such that each UPF in the plurality of UPFs is able to access the data storage layer. The worker modules maintain a context for each packet processing flow temporarily, while they are working with that flow. Once the worker module is no longer working with that flow, the context is discarded by the worker module and stored in the data storage layer. Those skilled in the art will appreciate that the concepts described herein are more widely applicable, however, and thus in some embodiments the UPF is implemented conventionally, without a data storage layer shared between multiple logical nodes.

The method begins in step 400, in which the UPF receives a message directly from a RAN node. The message may comprise a user data uplink packet, comprising user data or dummy data for the purposes of initiating the UP tunnel (e.g., a packet containing no payload, or a payload of filler bits), or a special signaling message which is nonetheless transmitted over the user plane.

According to embodiments of the disclosure the message received in step 400 comprises an indication of a downlink tunnel endpoint identifier of the radio access network node. For example, the downlink tunnel endpoint identifier may comprise a full GTP tunnel endpoint identifier (TEID) and a logical network address of the RAN node (e.g., an IP address or other transport network layer address such as Ethernet medium access control (MAC) address). This information enables the UPF to route new downlink packets directly to the RAN node, rather than waiting for configuration by other core network nodes such as the AMF or SMF.

According to embodiments of the disclosure, the message received in step 400 further comprises indication of an identifier for the PDU session to enable the UPF to retrieve the context for a session for a wireless device from the data storage layer.

The identifier for the context may correspond to or comprise an identifier for the wireless device and/or the PDU session of the wireless device. In some embodiments, the identifier comprises an uplink tunnel endpoint identifier (e.g., a GPRS Tunneling Protocol Tunnel Endpoint Identifier, GTP TEID). In some embodiments, the identifier may further comprise a logical network address (e.g., an Internet Protocol address), such that the identifier corresponds to a combination of a tunnel endpoint identifier and a logical network address.

The identifier for the context may be unique among those wireless devices having contexts stored within the data storage layer, or unique among all the contexts stored within the data storage layer.

The identifier for the context of the session may be assigned by the original UPF for the session or connection for the wireless device, with the data storage layer ensuring that the identifier is unique amongst the identifiers stored within the particular data storage layer.

For example, an identifier may be introduced which is valid in every UPF (e.g., that has access to the same data storage layer). In this solution the RAN node (e.g., where the trigger event is a mobility event) is enabled to select any UPF identified by different IP addresses, and the new UPF is able to retrieve the context from the data storage layer using the unique identifier. One advantage of this solution is that the IP layer (transport network layer) and the application layer (GTP) are separated from each other which simplifies implementation, testing etc.

For example, the UPF may generate a random identifier for the session, and check with the data storage layer whether that identifier is available (i.e., not used to identify any other session with a context stored in the data storage layer). If the identifier is available, the context can be stored in the data storage layer and associated with the identifier; if the identifier is not available, a further random identifier for the session is generated by the UPF. Those skilled in the art will appreciate that various alternatives to this process exist. For example, a UPF may generate an identifier in a structured way, designed to reduce the likelihood of collision between identifiers. Each UPF may be pre-assigned a respective range of values, from which to select identifiers. In a further alternative, a UPF may pre-register a range of values with the data storage layer, guaranteed to be unique at the data storage layer. In this case the UPF need not check with the data storage layer that a particular identifier value is available before its assignment to a session, and this can reduce latency when assigning identifiers for a newly established PDU session. When pre-registering the range of values, however, the UPF may follow a similar process as described above, by generating one or more identifiers (e.g., randomly) and checking with the data storage layer when those identifiers are available.

In one embodiment, the context identifier in the message received in step 400 may correspond to the complete context identifier previously used to the UPF (e.g., including both old GTP TEID and IP address prior to handover of the wireless device). Alternatively, a new default context identifier (e.g. a pre-defined value) may be used when the RAN node communicates for the first time and/or transmits a first uplink packet to a new UPF. This default context identifier may indicate to the new UPF that a new identifier needs to be allocated. The new UPF can then respond with a message which contains a new identifier for the wireless device which is associated with the IP address of the new UPF (in the case of UPF change). One advantage of this solution is that the context identifier does not need to be globally unique since it can be changed at any time when the UPF changes. The context identifier can be provided in the GTP header (e.g. extension header) of an UL packet to the UPF.

In a further alternative embodiment, the context identifier may comprise the old UE context identifier for reaching the UE and to include the old UPF IP address. If there is a need to select a new UPF (or UPF worker module), it is possible to use a load balancing function to re-direct an uplink packet to a new UPF taking over processing of the wireless device context. As a result of this, the RAN node may receive a response message assigning a new context identifier to be used for further communication (e.g., similar to the description above). It is also possible for the RAN node to continue to use the old IP address (i.e. for the old UPF) and rely on the load balancing function to route the packet to the new UPF (or UPF worker module). One advantage of this solution is that the context identifier does not need to be globally unique since it can be changed at any time when the UPF changes.

Each of the identifiers described above may be included in a header of the UL packet, for example by using a GTP extension header. Where the UL packet comprises a special signaling packet as described above, the packet may be configured according to the GTP Control (GTP-C) protocol.

In step 402, the UPF processes the message received in step 400. For example, in one embodiment, this step may comprise verifying the authenticity of the packet, e.g., by using some UE-specific security context known only by the RAN node and the UPF (e.g., a cryptographic signature, a security token or checksum specific to the UE or wireless device), by checking the source logical network address is correct, etc. If this authenticity fails, the method may stop at this point. For example, the UPF may refuse to process the message any further. Alternatively, the UPF may take one or more remediating actions, such as by transmitting a message to the RAN node comprising an indication of the failure.

In step 404, the UPF uses the identifier of the context (e.g., the identifier of the wireless device and/or the identifier of the session) in the message to retrieve a context for the wireless device or session specified in the message. Where the selected UPF is the same UPF as previously configured for the session (e.g., the trigger event is not mobility-related, or the UPF previously handled the session prior to mobility of the wireless device), the context may be stored locally in the UPF.

In other embodiments, particularly those where the UPF is implemented in a state-less architecture and has access to a data storage layer shared with one or more other UPFs, step 404 may comprise the UPF retrieving the context from the data storage layer using the identifier. As noted above, in such embodiments the identifier is unique among the sessions or wireless devices having contexts stored in the data storage layer, and thus the identifier uniquely identifies the context for a particular wireless device and/or session.

With the context, the UPF is able to provide services for the session. For example, the context may comprise a logical network address (e.g., an IP address) for an anchor UPF for the session. The UPF may thus enabled to route and forward packets for the session from the RAN node to the anchor UPF. Other services performed by the UPF may include one or more of: quality of service (QoS) handling, including packet marking, rate limiting, etc.; traffic usage reporting for billing and lawful intercept.

In step 406, the UPF establishes a downlink user plane tunnel to the RAN node, using the user plane tunnel endpoint identifier of the RAN node, contained in the message received in step 400. For example, the RAN node may transmit one or more downlink packets (from the anchor UPF, or a data network) directly to the RAN node using the downlink tunnel endpoint identifier contained in the message received in step 400.

In further steps (not illustrated), the UPF optionally updates the context stored in the data storage layer and/or informs other core network nodes of changes to the context to the context. These updates may take place in parallel with the transmission of downlink data in step 406, for example. For example, the UPF may transmit a message to the data storage layer informing it that the context should be updated to reflect a new UPF (e.g., to include a logical network address for the UPF), to recite a new value for the identifier, etc. Similarly, the UPF may transmit a message to other core network nodes such as the SMF, comprising an indication of a new UPF for the session, or an indication that the wireless device has moved to a new area, etc.

Figure 6:
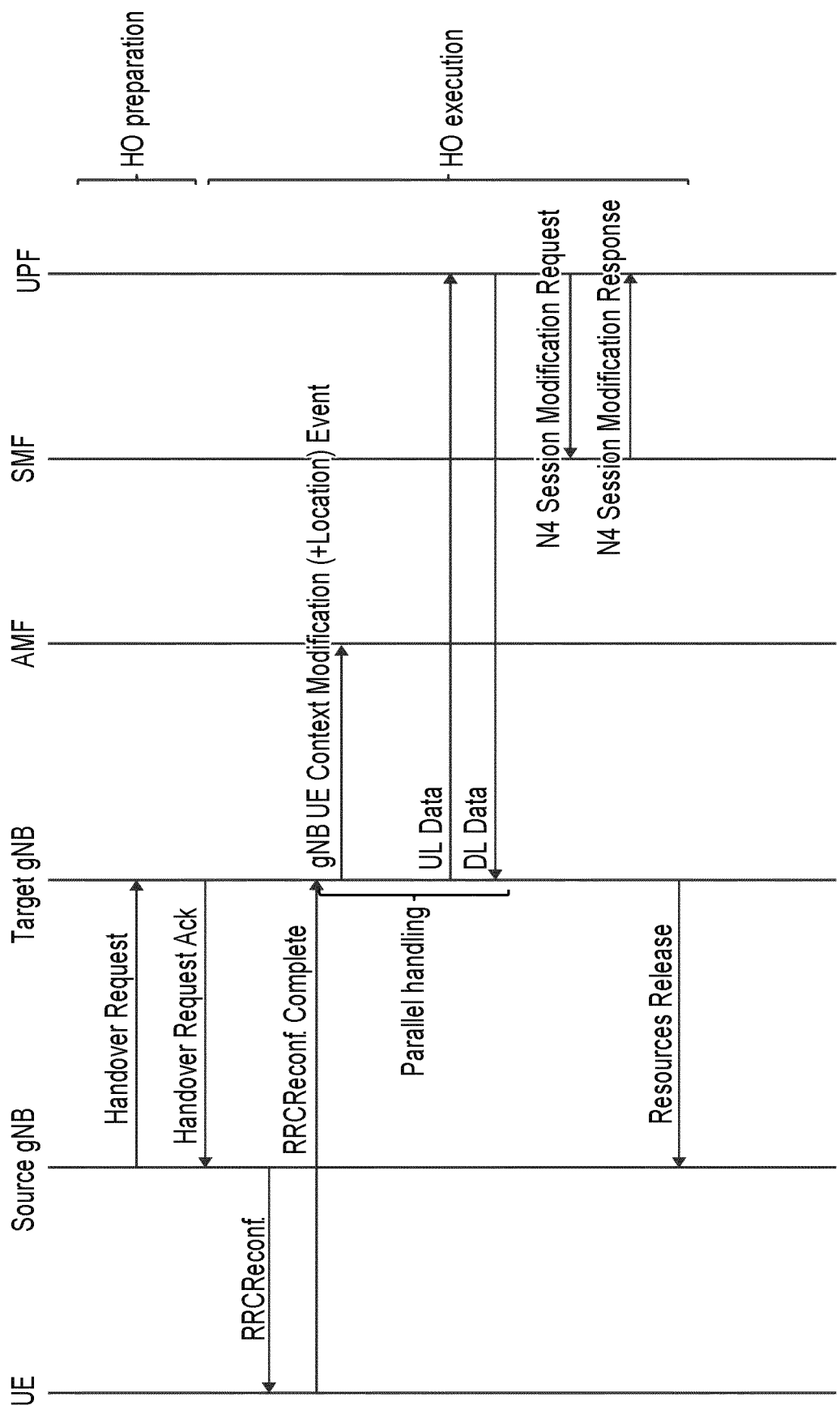
FIG. 6 is a signaling diagram showing mobility according to embodiments of the disclosure.
Figure 7:
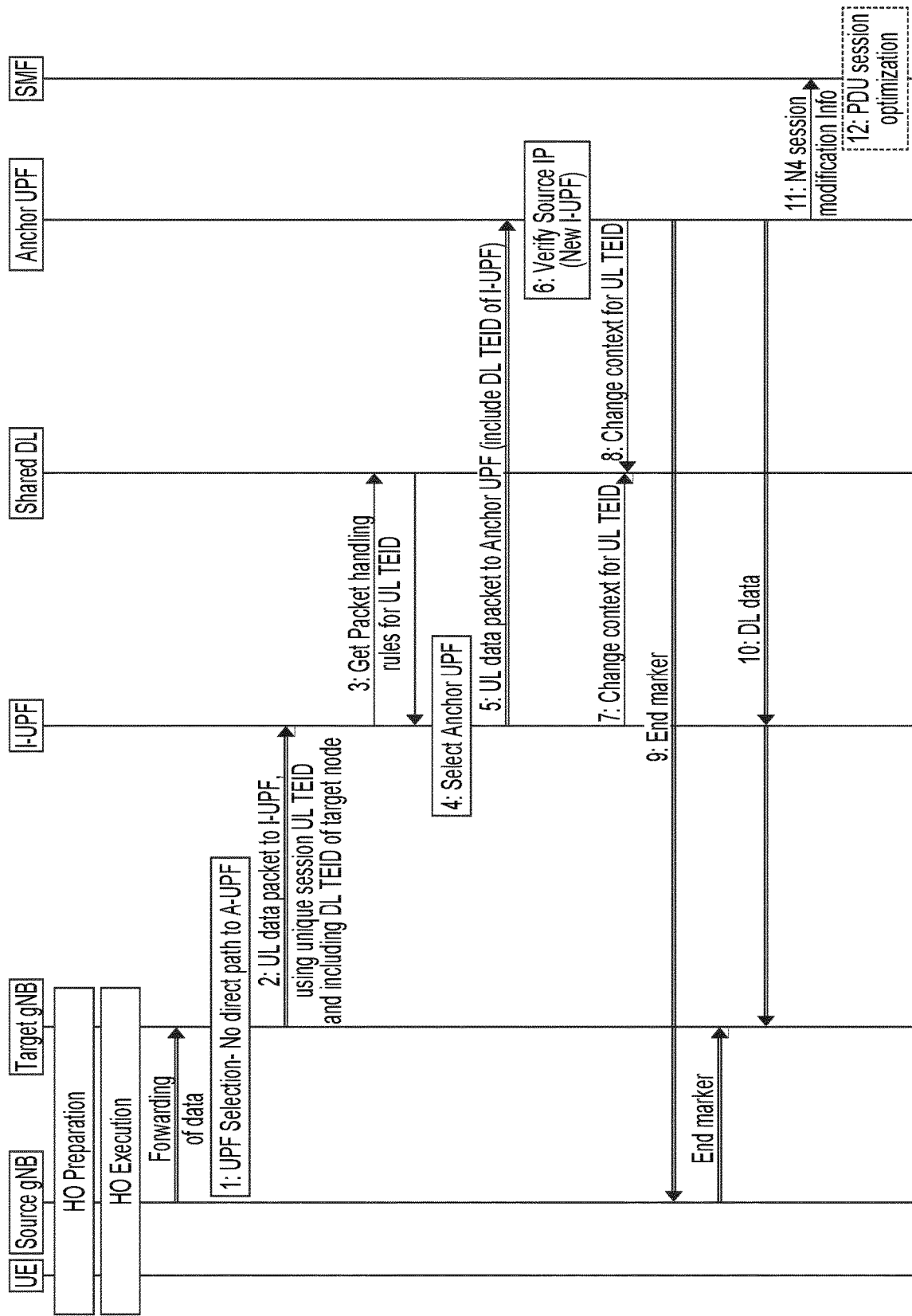
FIG. 7 is a signaling diagram showing mobility according to further embodiments of the disclosure.

The preceding disclosure thus describes a method for initiating a tunnel to a UPF in a communication network. FIGS. 6 and 7 provide example implementations of this method in various mobility scenarios (it being noted that the various trigger events described above are not limited to mobility scenarios).

FIG. 6 is a signaling diagram showing mobility of a wireless device (UE) from a source RAN node (Source gNB) to a target RAN node (Target gNB), but where the UPF remains the same after the handover.

The wireless device, source RAN node and target RAN node prepare and execute handover of the wireless device from the source RAN node to the target RAN node. This process may be largely conventional, with the handover being triggered by the UE or the network, based on radio measurement reports or other data.

For example, the source RAN node may transmit a Handover Request message to the target RAN node. According to embodiments of the disclosure, this message may comprise an indication of an uplink tunnel endpoint identifier of the UPF. The message may also comprise an indication of the identifier for the context of the UE or the session. The target RAN node transmits an acknowledgement message (Handover Request Ack) to the source RAN node. Upon receipt of the acknowledgement message, the source RAN node instructs the wireless device to reconfigure its connection from the source RAN node to the target RAN node (RRC Reconf.). The wireless device may perform a random access process (not illustrated) to initiate a connection to the target RAN node and, once the connection is established, transmit a message to the target RAN node indicating that reconfiguration of the connection is complete (RRC Reconf. Complete).

Responsive to receipt of the message from the wireless device, the target RAN node transmits a message directly to the UPF indicated in the handover request message (e.g., using the uplink tunnel endpoint identifier). In the illustrated embodiment, the message comprises UL data. According to embodiments of the disclosure, the message additionally comprises an indication of a downlink tunnel endpoint identifier of the RAN node. The message further comprises an indication of the identifier for the context of the wireless device, e.g., as described above with respect to steps 306 and 400.

In parallel with transmission of UL data to the UPF, in the illustrated embodiment the target RAN node updates the AMF that the wireless device has moved from the source RAN node to the target RAN node. The AMF thus updates the context it has stored for the session, and in particular may move the NG/N2 signaling connection for the session.

The UPF may then retrieve the context for the session of the wireless device as described above and use the downlink tunnel endpoint identifier to transmit downlink data directly to the RAN node.

If the SMF is dependent on the location of the wireless device for its actions, it may subscribe to changes in the wireless device location from the AMF that would consequently notify the SMF when updated by the target RAN node as described above. Optionally (e.g. based on policy or configuration) the UPF may also notify the SMF that the UE has transferred to the target RAN node (e.g., in a N4 Session Modification Request message). As a result of this step the SMF may decide to change the UPF configuration if necessary.

With the session for the wireless device now operational via the target RAN node, the target RAN node transmits a message to the source RAN node advising that any resources reserved in the source RAN node for the wireless device may now be released.

FIG. 6 thus shows an embodiment in which the UPF for the session is the same before and after handover of the wireless device from the source RAN node to the target RAN node. However, as noted above, in addition to non-mobility scenarios, the methods described herein are also applicable to mobility scenarios in which the UPF is different; so-called inter-UPF handover. FIG. 7 is a signaling diagram or call flow showing the implementation of this process according to embodiments of the disclosure.

The wireless device, source RAN node and target RAN node perform handover preparation and handover execution. This process may be substantially as described above with respect to FIG. 6, for example, and involve the transmission of handover request messages, RRC reconfiguration messages, and random access by the wireless device towards the target RAN node. Once handover has been executed (but before any DL data paths have been updated in the core network), any user data sent to the source RAN node for onward transmission to the wireless device may be forwarded to the target RAN node ("Forwarding of data").

In step 1, the target RAN node selects a UPF for the session and, in the illustrated example, selects a different UPF (intermediate UPF, or "I-UPF" in FIG. 7) than that previously used for the session ("Anchor UPF"). For example, the target RAN node may be unable to communicate directly with the anchor UPF (e.g., because the target RAN node is in a different network area or LBO area to the anchor UPF). Thus the target RAN node selects a different UPF, e.g. selects a different logical network address (e.g., IP address), and sends an UL packet or other suitable message towards the target UPF comprising an indication of a downlink tunnel endpoint identifier of the target RAN node, and also an identifier for the wireless device or the session of the wireless device (e.g., as described above with respect to steps 306 and 400). In one embodiment, this first UL packet may contain as UL GTP TEID a default GTP TEID indicating to the target UPF that a new UL GTP TEID needs to be allocated. When the target UPF receives the identifier of the context (wireless device and/or session), it fetches the context from the data storage layer (step 3), selects the anchor UPF indicated in the context (step 4) and forwards the UL packet to the anchor UPF using the logical network address of the anchor UPF available from the retrieved context (step 5). In step 6, the anchor UPF may optionally verify that the packet is from the correct wireless device e.g. by checking that the source IP address is correct or by verifying a security token or checksum. The target UPF (step 7) and/or the anchor UPF (step 8) can also update the context stored in the data storage layer e.g. about the new wireless device location or in case a new identifier has been assigned. In step 9, the anchor UPF sends a DL packet end marker to the source RAN node to inform the RAN nodes that no more DL packets will be sent on the old path (e.g., via the source RAN node). This end marker is forwarded to the target RAN node by the source RAN node. In step 10, optionally in parallel with step 9, the anchor UPF establishes a downlink user plane tunnel to the target RAN node using the downlink tunnel endpoint identifier contained in the messages transmitted in steps 2 and 5. In step 11, the anchor UPF optionally updates the SMF that the UE has transferred to the target RAN node (e.g., in a N4 Session Modification Request message). As a result of this step the SMF may decide to change the UPF configuration if necessary (step 12).

Figure 8:
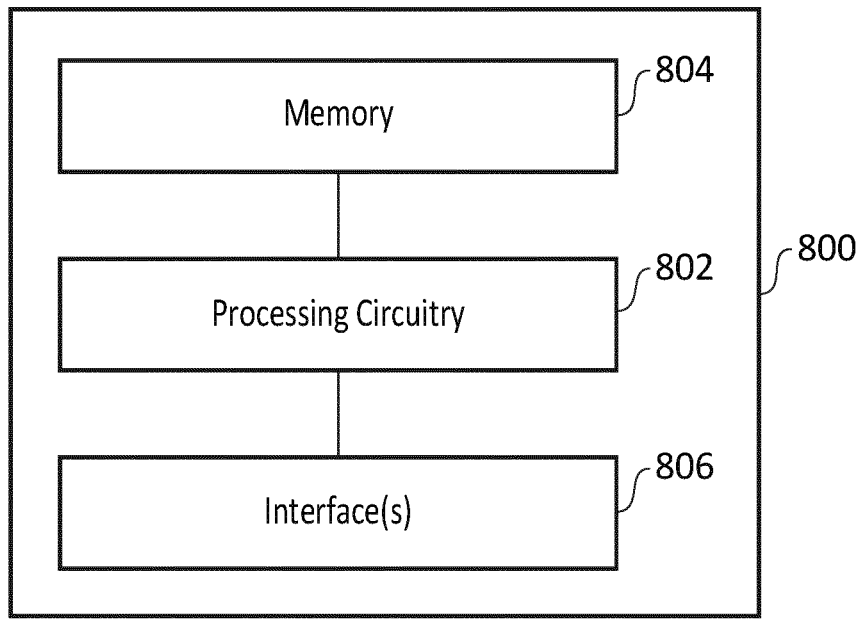
FIGS. 8 and 9 are schematic diagrams of a radio access network node according to embodiments of the disclosure.

FIG. 8 is a schematic diagram of a radio access network node 800 according to embodiments of the disclosure. The radio access network node may perform the signaling and functions of the target RAN node described above with respect to one or more of FIGS. 3 and 5-7, for example.

The node 800 comprises processing circuitry 802 (such as one or more processors, digital signal processors, general purpose processing units, etc.), a computer-readable medium (e.g., memory such as read-only memory (ROM), random-access memory, cache memory, flash memory devices, optical storage devices, etc.) 804 and one or more interfaces 806. The components are illustrated coupled together in series; however, those skilled in the art will appreciate that the components may be coupled together in any suitable manner (e.g., via a system bus or suchlike).

According to embodiments of the disclosure, the computer-readable medium 804 stores instructions which, when executed by the processing circuitry 802, cause the node 800 to: responsive to detection of a trigger event associated with a wireless device having a connection to the telecommunications network via the radio access network node or seeking to establish a connection to the telecommunications network via the radio access network node, transmit a message directly to a user plane core network node providing functionality for the connection via the radio access network node. The message comprises one or more of: an indication of an identifier of the wireless device; and an indication of an identifier of a session for the wireless device. The message further comprises an indication of a downlink tunnel endpoint identifier of the radio access network node.

In further embodiments of the disclosure, the node 800 may comprise power circuitry (not illustrated). The power circuitry may comprise, or be coupled to, power management circuitry and is configured to supply the components of node 800 with power for performing the functionality described herein. Power circuitry may receive power from a power source. The power source and/or power circuitry may be configured to provide power to the various components of node 800 in a form suitable for the respective components (e.g., at a voltage and current level needed for each respective component). The power source may either be included in, or external to, the power circuitry and/or the node 800. For example, the node 800 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 9:
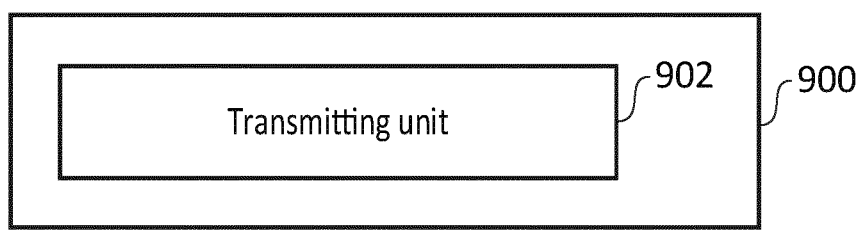

FIG. 9 is a schematic diagram of a radio access network node 900 according to further embodiments of the disclosure. The radio access network node may perform the signaling and functions of the target RAN node described above with respect to one or more of FIGS. 3 and 5-7, for example.

The node 900 comprises a transmitting unit 902. The transmitting unit 902 is configured to, responsive to detection of a trigger event associated with a wireless device having a connection to the telecommunications network via the radio access network node or seeking to establish a connection to the telecommunications network via the radio access network node, transmit a message directly to a user plane core network node providing functionality for the connection via the radio access network node. The message comprises one or more of: an indication of an identifier of the wireless device; and an indication of an identifier of a session for the wireless device. The message further comprises an indication of a downlink tunnel endpoint identifier of the radio access network node.

Figure 10:
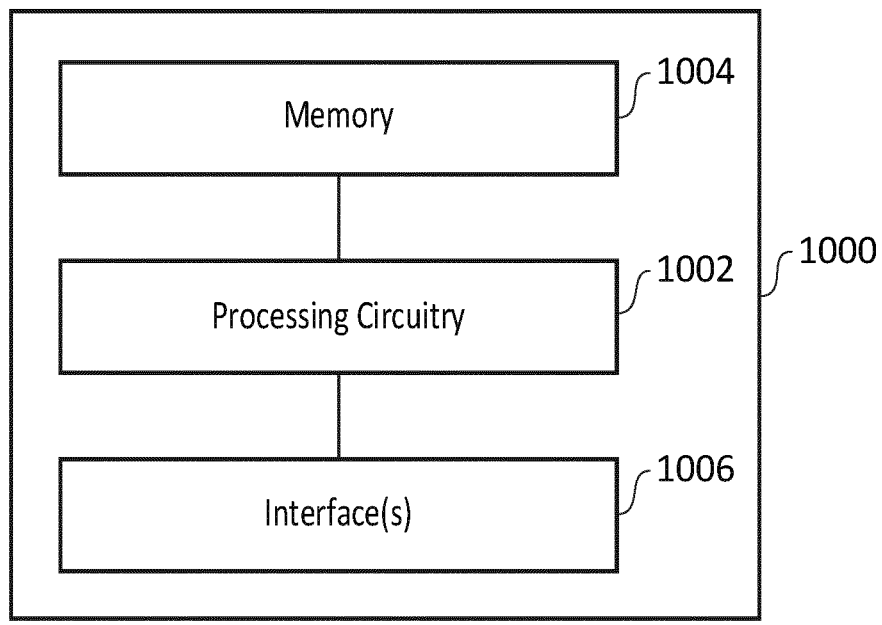
FIGS. 10 and 11 are schematic diagrams of a user plane core network node according to embodiments of the disclosure.

FIG. 10 is a schematic diagram of a user plane core network node 1000 according to embodiments of the disclosure. The user plane core network node 1000 may perform the signaling and functions of the user plane core network node described above with respect to FIG. 4, of the UPF described above with respect to FIG. 5, and/or of the Target UPF described above with respect to FIGS. 6 and/or 7, for example.

The node 1000 comprises processing circuitry 1002 (such as one or more processors, digital signal processors, general purpose processing units, etc.), a computer-readable medium (e.g., memory such as read-only memory (ROM), random-access memory, cache memory, flash memory devices, optical storage devices, etc.) 1004 and one or more interfaces 1006. The components are illustrated coupled together in series; however, those skilled in the art will appreciate that the components may be coupled together in any suitable manner (e.g., via a system bus or suchlike).

According to embodiments of the disclosure, the computer-readable medium 1004 stores instructions which, when executed by the processing circuitry 1002, cause the node 1000 to: responsive to detection of a trigger event associated with a wireless device having a connection to the telecommunications network via a radio access network node or seeking to establish a connection to the telecommunications network via a radio access network node, receive a message directly from a radio access network node. The message comprises one or more of: an indication of an identifier of the wireless device; and an indication of an identifier of a session for the wireless device, and further comprises an indication of a downlink tunnel endpoint identifier of the radio access network node. The node 1000 is further caused to use the indication of the downlink tunnel endpoint identifier to establish a downlink user plane tunnel to the radio access network node for a session between the radio access network node and the wireless device.

In further embodiments of the disclosure, the node 1000 may comprise power circuitry (not illustrated). The power circuitry may comprise, or be coupled to, power management circuitry and is configured to supply the components of node 1000 with power for performing the functionality described herein. Power circuitry may receive power from a power source. The power source and/or power circuitry may be configured to provide power to the various components of node 1000 in a form suitable for the respective components (e.g., at a voltage and current level needed for each respective component). The power source may either be included in, or external to, the power circuitry and/or the node 1000. For example, the node 1000 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 11:
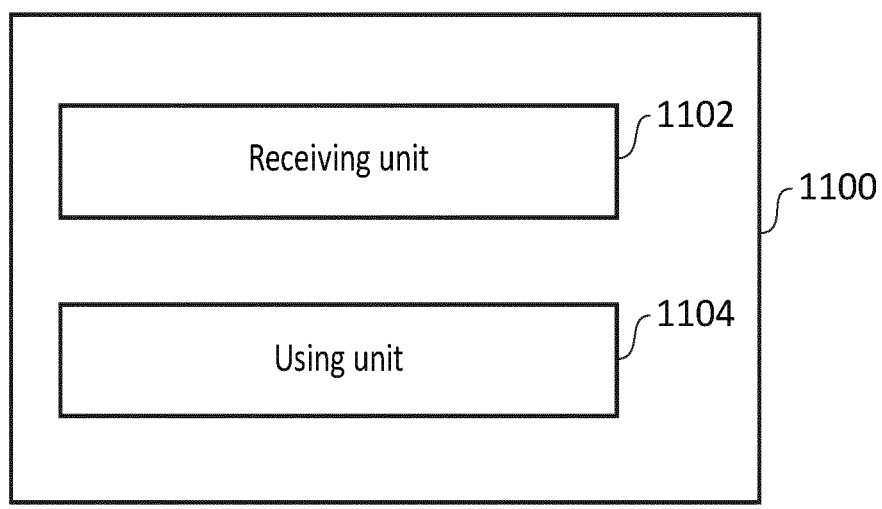

FIG. 11 is a schematic diagram of a user plane core network node 1100 according to further embodiments of the disclosure. The user plane core network node 1100 may perform the signaling and functions of the user plane core network node described above with respect to FIG. 4, of the UPF described above with respect to FIG. 5, and/or of the Target UPF described above with respect to FIGS. 6 and/or 7, for example.

The node 1100 comprises a receiving unit 1102 and a using unit 1104. The receiving unit 1102 is configured to responsive to detection of a trigger event associated with a wireless device having a connection to the telecommunications network via a radio access network node or seeking to establish a connection to the telecommunications network via a radio access network node, receive a message directly from a radio access network node. The message comprises one or more of: an indication of an identifier of the wireless device; and an indication of an identifier of a session for the wireless device, and further comprises an indication of a downlink tunnel endpoint identifier of the radio access network node. The using unit 1104 is configured to use the indication of the downlink tunnel endpoint identifier to establish a downlink user plane tunnel to the radio access network node for a session between the radio access network node and the wireless device.

The disclosure thus provides methods for initiating a tunnel for a session or connection of a wireless device, performed by a RAN node and a user plane core network node. The disclosed methods enable a reduction in the latency of downlink data, by providing an indication of a downlink tunnel endpoint identifier of the RAN node to the UPF, so that downlink data can be sent directly to the RAN node more quickly than in conventional methods (which may require transmission via a source RAN node for longer periods).

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

The invention claimed is:

1. A radio access network node for a telecommunications network, the radio access node comprising:
   processing circuitry; and
   a non-transitory machine-readable medium storing instructions which, when executed by the processing circuitry, cause the radio access network node to:
      responsive to detection of a trigger event associated with a wireless device having a connection to the telecommunications network via the radio access network node or seeking to establish a connection to the telecommunications network via the radio access network node, transmit, directly to a user plane core network node, a message initiating establishment of a user-plane tunnel for the connection between the radio access network node and the user plane core network node, wherein
      the message comprises a first indication of an identifier, wherein the first indication is an indication of an identifier of the wireless device or an indication of an identifier of a session for the wireless device,
      the message further comprises an indication of a downlink tunnel endpoint identifier of the radio access network node, and
      the first indication of the identifier is different than and separate from the indication of the downlink tunnel identifier.

2. The radio access network node of claim 1, wherein the message transmitted to the user plane core network node further comprises an indication of a transport layer protocol address for the radio access network node.

3. The radio access network node of claim 1, wherein the trigger event comprises one or more of: handover of the wireless device from a source radio access network node to the radio access network node; establishment or re-establishment of a session between the wireless device and the radio access network node; transition by the wireless device from an idle or inactive state to an active or connected state.

4. The radio access network node of claim 3, wherein
the trigger event is handover of the wireless device,
the message transmitted to the user plane core network node is a first message, and
the radio access network node is further caused to transmit a second message to an Access and Mobility Management Function comprising an indication that the wireless device has been handed over to the radio access network node.

5. The radio access network node of claim 4, wherein the first message and the second message are transmitted in parallel.

6. The radio access network node of claim 1, wherein the radio access network node is further caused to receive the first indication of the identifier in a message from a core network node.

7. The radio access network node of claim 6, wherein the core network node is an Access and Mobility Management Function.

8. The radio access network node of claim 1, wherein the radio access network node is further caused to receive the first indication of the identifier in a message from the source radio access network node.

9. The radio access network node of claim 1, wherein
the message comprises a header, and
the first indication of the identifier and/or the indication of the downlink tunnel endpoint identifier are contained within the header of the message.

10. The radio access network node of claim 1, wherein the message transmitted to the user plane core network node comprises an uplink user plane packet.

11. The radio access network node of claim 10, wherein the uplink user plane packet comprises one or more of: user data; dummy user data; or a control message.

12. The radio access network node of claim 1, wherein the radio access network node is further caused to select the user plane core network node from a plurality of candidate user plane core network nodes.

13. A user plane core network node for a telecommunications network, the user plane core network node comprising:
processing circuitry; and
a non-transitory machine-readable medium storing instructions which, when executed by the processing circuitry, cause the user plane core network node to:
responsive to detection of a trigger event associated with a wireless device having a connection to the telecommunications network via a radio access network node or seeking to establish a connection to the telecommunications network via the radio access network node, receive a message directly from the radio access network node, the message comprising: i) a first indication of an identifier, wherein the first indication is an indication of an identifier of the wireless device or an indication of an identifier of a session for the wireless device and ii) an indication of a downlink tunnel endpoint identifier of the radio access network node, wherein the first indication of the identifier is different than and separate from the indication of the downlink tunnel identifier; and
use the indication of the downlink tunnel endpoint identifier to establish a downlink user plane tunnel to the radio access network node for a session between the radio access network node and the wireless device.

14. The user plane core network node of claim 13, wherein the message received from the ran access network node further comprises an indication of a transport layer protocol address for the radio access network node.

15. The user plane core network node of claim 13, wherein the trigger event comprises one or more of: handover of the wireless device from a source radio access network node to the radio access network node; establishment or re-establishment of a session between the wireless device and the radio access network node; or transition by the wireless device from an inactive state to an active or connected state.

16. The user plane core network node of claim 15, wherein
the trigger event comprises handover of the wireless device and the user plane core network node is further caused to transmit a message to a Session Management Function (SMF) comprising an indication that the wireless device has been handed over to the radio access network node, or
the trigger event comprises a transition by the wireless device from an inactive state to an active or connected state and the user plane core network node is further caused to transmitting a message to a SMF comprising an indication that the wireless device has transitioned from an inactive state to an active or connected state.

17. The user plane core network node of claim 13, wherein
the message comprises a header, and
the first indication of the identifier and/or the indication of the downlink tunnel endpoint identifier are contained within the header of the message.

18. The user plane core network node of claim 13, wherein the message received from the radio access network node comprises an uplink user plane packet.

19. The user plane core network node of claim 18, wherein the uplink user plane packet comprises one or more of: user data; dummy user data; and a control message.

* * * * *